(12) United States Patent
Cutler

(10) Patent No.: US 6,842,608 B2
(45) Date of Patent: Jan. 11, 2005

(54) RESPONSE CALIBRATION SCHEME USING FREQUENCY-SHIFTED STIMULUS SIGNALS

(75) Inventor: Robert T. Cutler, Everett, WA (US)

(73) Assignee: Agilent Technologies, Inc., Palo Alto, CA (US)

( * ) Notice: Subject to any disclaimer, the term of this patent is extended or adjusted under 35 U.S.C. 154(b) by 659 days.

(21) Appl. No.: 09/974,504

(22) Filed: Oct. 10, 2001

(65) Prior Publication Data

US 2003/0073407 A1 Apr. 17, 2003

(51) Int. Cl.[7] .......................... H04B 17/00; H04B 3/46; H04B 1/10; H04Q 1/20
(52) U.S. Cl. ............................... 455/67.14; 455/67.13; 455/226.1; 375/227; 375/239; 375/254
(58) Field of Search .......................... 455/67.13, 67.14, 455/67.16, 115.1, 114.3, 226.1; 375/219, 224, 227, 222, 226, 239, 254

(56) References Cited

U.S. PATENT DOCUMENTS

| | | | |
|---|---|---|---|
| 6,344,749 B1 * | 2/2002 | Williams | 324/620 |
| 6,570,394 B1 * | 5/2003 | Williams | 324/620 |
| 6,636,722 B1 * | 10/2003 | Dalebroux et al. | 455/67.11 |
| 6,751,447 B1 * | 6/2004 | Jin et al. | 455/114.3 |

OTHER PUBLICATIONS

Bernard Widrow and Samuel Sterns—"Adaptive Signal Processing": Prentice–Hall, Copyright 1985; ISBN 0–13–004029–0; p. 204—Channel Estimation; p. 206—Applications Part IV.

David R. Smith—"Digital Transmission Systems"; Wiley, John & Sons, Inc., Jun. 1985; ISBN 0534033822; p. 319—Equalization.

Copy of pending U.S. Appl. No. 09/974,627, filed Oct. 10, 2001; Inventor—Robert T. Cutler.

* cited by examiner

*Primary Examiner*—Binh Tieu
*Assistant Examiner*—Thai Vu
(74) *Attorney, Agent, or Firm*—John L. Imperato

(57) ABSTRACT

The response of a receiver is calibrated using frequency-shifted stimulus signals. A source provides a stimulus signal that has a non-zero bandwidth and an adjustable spectral position. A signal path coupled between the source and the receiver introduces distortion to the stimulus signal. The receiver acquires a first digital representation of the stimulus signal at an output of the signal path with the stimulus signal adjusted to a first spectral position and acquires a second digital representation of the stimulus signal at the output of the signal path with the stimulus signal adjusted to a second spectral position that is shifted from the first spectral position by a predetermined frequency offset. A processor, designates the distortion introduced to the stimulus signal by the signal path to be equivalent at the first spectral position and the second spectral position. The processor extracts a first combined frequency response of the receiver and the signal path at three or more frequencies within the bandwidth of the stimulus signal, and extracts a second combined frequency response of the receiver and signal path at the three or more frequencies and then determines the frequency response of the receiver from the first combined frequency response and the second combined frequency response. The response of the signal path is optionally determined according to the response calibration scheme under condition that the stimulus signal is known, characterized, designated or otherwise established.

20 Claims, 4 Drawing Sheets

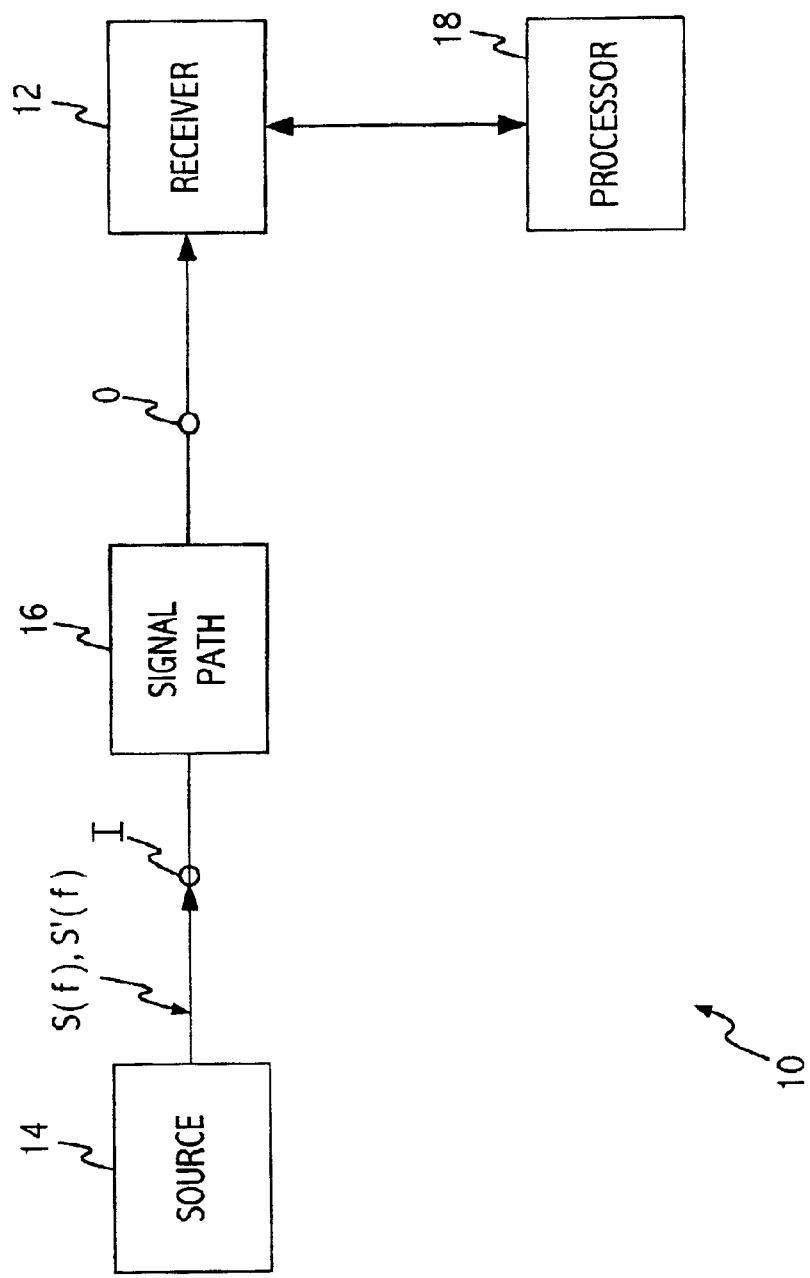

RESPONSE CALIBRATION SCHEME USING FREQUENCY-SHIFTED STIMULUS SIGNALS

BACKGROUND OF THE INVENTION

Many types of measurement and communication systems include a receiver coupled to a signal source through a signal path. Performance of these systems can be limited by amplitude unflatness, group delay variations and other distortion in the receiver or signal path. Typically, calibration schemes overcome performance limitations on the systems that are attributed to distortion. Known calibration schemes, such as those employed in dynamic signal analyzers, vector signal analyzers and other types of receivers, use the signal source to stimulate the receiver with a known stimulus signal. Response of the receiver to the known stimulus signal is determined and compared to a predicted response to correct for distortion introduced by the receiver. However, when the signal path coupling the source to the receiver introduces distortion to the stimulus signal, the accuracy of this calibration scheme relies on both the accuracy with which the stimulus signal is known and the accuracy with which the signal path can be characterized. There is a need for a response calibration scheme that does not rely on accurately determining the characteristics of the stimulus signal and an accurate characterization of the signal path.

SUMMARY OF THE INVENTION

In a response calibration scheme constructed according to a first embodiment of the present invention, the response of a receiver is determined using frequency-shifted stimulus signals. A source provides a stimulus signal that has a non-zero bandwidth and an adjustable spectral position. A signal path coupled between the source and the receiver introduces distortion to the stimulus signal. The receiver acquires a first digital representation of the stimulus signal at an output of the signal path with the stimulus signal adjusted to a first spectral position. The receiver also acquires a second digital representation of the stimulus signal at the output of the signal path with the stimulus signal adjusted to a second spectral position that is shifted from the first spectral position by a predetermined frequency offset. A processor designates the distortion introduced to the stimulus signal by the signal path to be equivalent at the first spectral position and the second spectral position. The processor extracts a first combined frequency response of the receiver and the signal path at three or more designated frequencies within the bandwidth of the stimulus signal, and a second combined frequency response of the receiver and signal path at the three or more designated frequencies. The processor then determines the response of the receiver from the first combined frequency response and the second combined frequency response. The response of the signal path is optionally determined according to the response calibration scheme under condition that the stimulus signal is known, characterized, designated or otherwise established. According to a second embodiment of the present invention, the response calibration scheme is implemented as a method.

BRIEF DESCRIPTION OF THE DRAWINGS

FIG. 1 shows a system for employing the response calibration scheme constructed according to the embodiments of the present invention.

DETAILED DESCRIPTION OF THE EMBODIMENTS

Figure 2A:
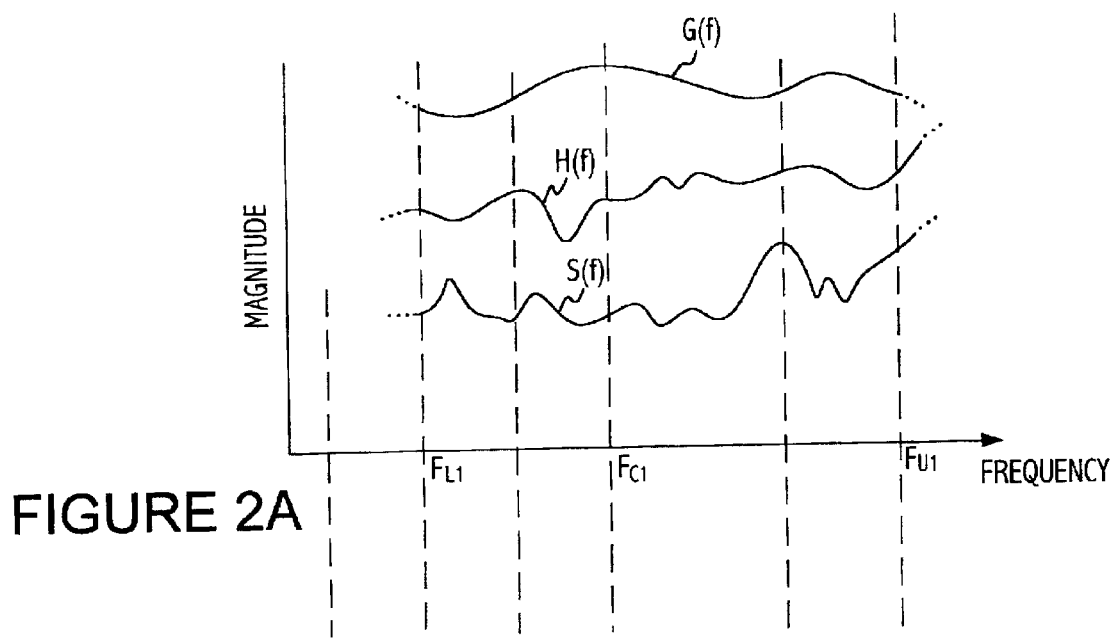
FIGS. 2A–3B show examples of frequency-shifted stimulus signals included in the response calibration scheme constructed according to the embodiments of the present invention.

FIG. 1 shows a system 10 including a receiver 12, a source 14, a signal path 16 and a processor 18. Response of the receiver 12 is determined according to the response calibration scheme constructed according to the embodiments of the present invention. The response of the receiver 12 is the frequency response, time domain impulse response, or any other response suitable for calibrating the receiver 12. The response of the receiver 12 is determined using stimulus signals S(f), S'(f) that are frequency-shifted relative to each other.

Figure 2B:
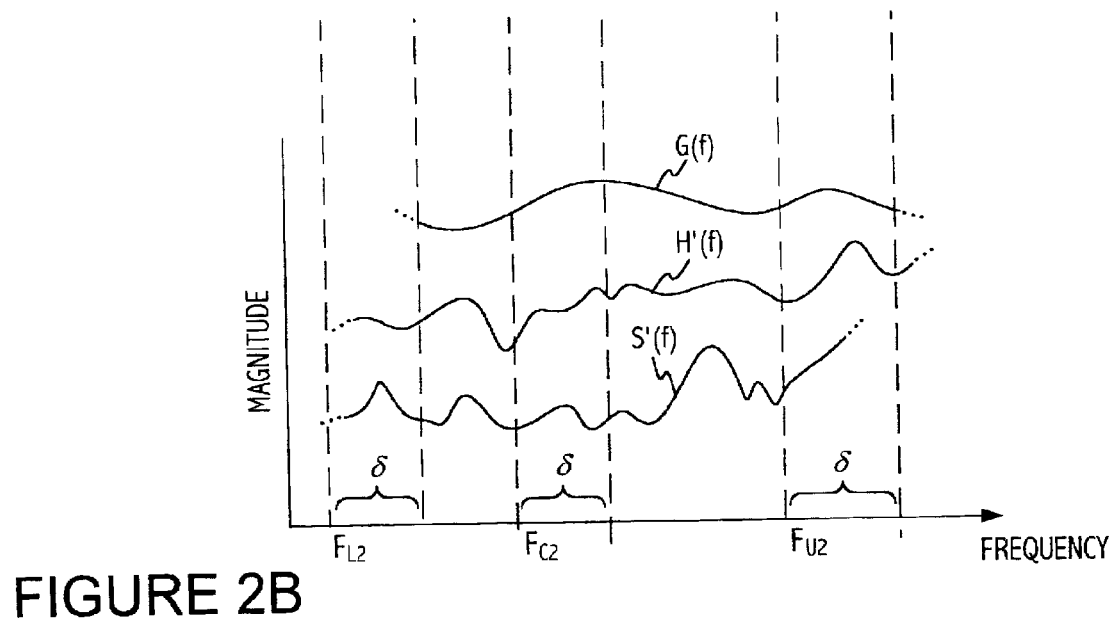
Figure 3A:
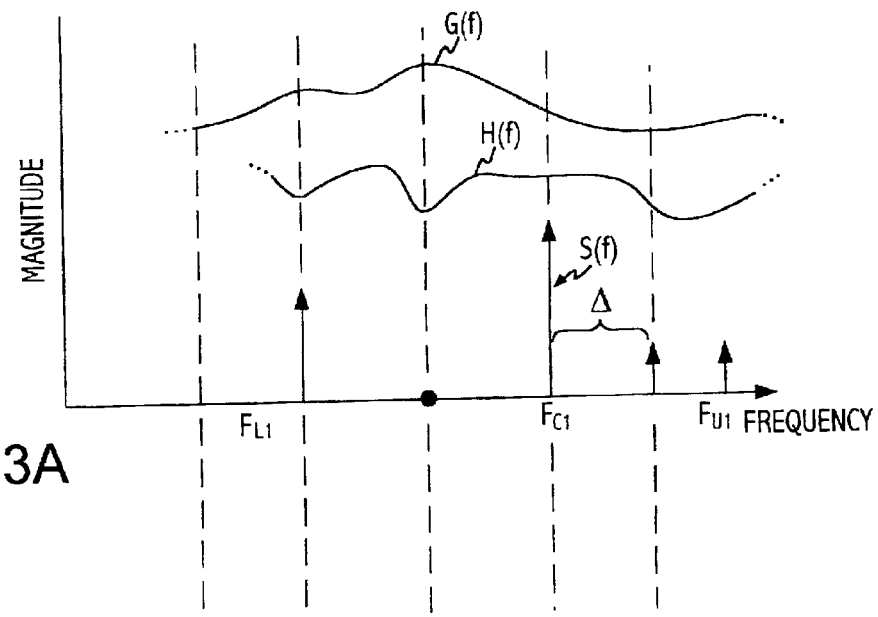
Figure 3B:
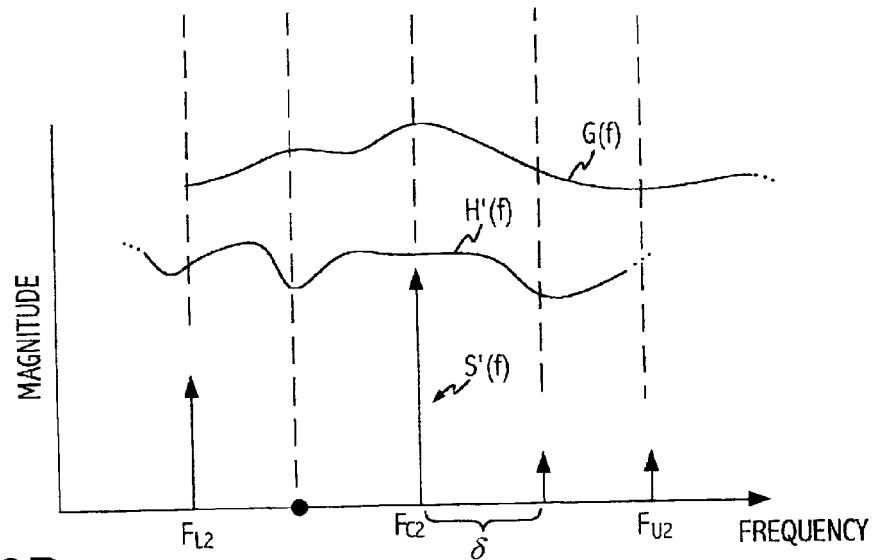

The source 14 provides the stimulus signals S(f), S'(f). The stimulus signals S(f), S'(f) have non-zero bandwidth and have adjustable spectral positions $F_{C1}$, $F_{C2}$. Examples of the stimulus signals S(f), S'(f) are shown in FIGS. 2A–3B. The stimulus signals S(f), S'(f) have continuous spectra as shown in FIGS. 2A and 2B. Alternatively, the stimulus signals S(f), S'(f) have discrete spectra as shown in FIGS. 3A and 3B, where the stimulus signals S(f), S'(f) are frequency combs with discrete teeth separated by a frequency spacing Δ. The stimulus signals S(f), S'(f) have the characteristic that the relative amplitudes and relative phases of spectral components within the bandwidth of the stimulus signal S(f) remain fixed whether the stimulus signal S(f) is in the first spectral position $F_{C1}$ or in the second spectral position $F_{C2}$ resulting in the stimulus signal S'(D).

Through the signal path 16, the stimulus signals S(f), S'(f) are coupled to the receiver 12. The signal path 16 has an input I coupled to the source 14 and an output O coupled to the receiver 12. The signal path 16 typically includes mixers, modulators or other active elements in combination with filters, transmission lines or other passive elements, and has a frequency response H(f) that introduces distortion to the stimulus signals S(f), S'(f). The distortion modifies the amplitude and/or the phase of the stimulus signal S(f), S'(f) between the input I and the output O of the signal path 16. The frequency response H(f), the time domain impulse response, or any other response suitable for calibrating the signal path 16 is optionally determined according to the response calibration scheme under condition that the stimulus signal S(f) is known, characterized, designated or otherwise established.

The receiver 12 is a dynamic signal analyzer, vector signal analyzer, heterodyne system, or other signal detection system, and has a frequency response G(f). The receiver 12 intercepts the stimulus signal S(f), as distorted by the signal path 16, and acquires a first digital representation Y1(f) of the distorted stimulus signal, with the stimulus signal S(f) adjusted to the first spectral position $F_{C1}$. The first digital representation Y1(f) is a product expressed in equation 1.

$$Y1(f) = S(f)H(f)G(f). \quad (1)$$

The receiver 12 intercepts the stimulus signal S'(f), as distorted by the signal path 16, and acquires a second digital representation Y2(f) of the distorted stimulus signal, with the stimulus signal adjusted to the second spectral position $F_{C2}$ that has a frequency offset δ from the first spectral position $F_{C1}$. The second digital representation is a product expressed in equation 2.

$$Y2(f) = S'(f)H'(f)G(f). \quad (2)$$

In equation 2, the stimulus signal S'(f) represents the stimulus signal S(f) as shifted by the frequency offset δ. According to this frequency shifting, S'(f)=S(f+δ), indicating that the second spectral position $F_{C2}$ is at a lower frequency than the first spectral position $F_{C1}$. The frequency response H'(f) represents the frequency response H(f) of the signal path 16 also shifted in frequency by the frequency offset δ. Thus, H'(f)=H(f+δ), indicating that the second spectral position $F_{C2}$ is at a lower frequency than the first spectral position $F_{C1}$.

The processor 18 is coupled to the receiver 12. Typically, the processor 18 is a microprocessor or computer that is either incorporated within the receiver 12, or that is external to the receiver 12. The processor 18 extracts a first combined frequency response $X1_k$ of the receiver 12 and the signal path 16 at at least three designated frequencies $f_k$ within the bandwidth of the stimulus signal S(f). This first combined frequency response $X1_k=H(f_k)G(f_k)$, where k=0, 1, 2, ... N-1, an integer indexing each of the designated frequencies $f_k$.

The first combined frequency response $X1_k$ is obtained by normalizing the first digital representation $Y1(f_k)$ by the stimulus signal S(f) at the three or more designated frequencies $f_k$. According to the normalization, $X1_{k=Y1(fk)}/S(f_k)$, where $S(f_k)$ represents the stimulus signal S(f) at the designated frequencies $f_k$. Alternatively, the first combined frequency response $X1_k$ is obtained by adaptive filtering to obtain a combined impulse response of the signal path 16 and the receiver 12. Mapping this combined impulse response into the frequency domain provides the first combined frequency response $X1_k$ at the three or more designated frequencies $f_k$.

The processor 18 extracts a second combined frequency response $X2_k$ of the receiver 12 and the signal path 16 at the three or more designated frequencies $f_k$. This second combined frequency response $X2_k=H'(f_k)G(f_k)$, where k=0, 1, 2... N-1, where $H'(f_k)=H(f_{k+1})$, indicating that the second spectral position $F_{C2}$ is at a lower frequency than the first spectral position $F_{C1}$.

The second combined frequency response $X2_k$ is obtained by normalizing the second digital representation Y2(f) by the stimulus signal S'(f) at the three or more designated frequencies $f_k$. According to the normalization, $X2_k=Y2(f_k)/S'(f_k)$, where $S'(f_k)=S(f_{k+1})$. Alternatively, the second combined frequency response $X2_k$ is obtained by adaptive filtering to obtain the impulse response of the signal path 16 and the receiver 12. Mapping the obtained impulse response to the frequency domain provides the second combined frequency response $X2_k$ at the three or more designated frequencies $f_k$. In addition to using normalization or adaptive filtering to extract the combined frequency responses $X1_k$ and $X2_k$, cross correlation, cross spectrum analysis, adaptive channel modeling, and other known techniques are alternatively used to extract the combined frequency responses $X1_k$ and $X2_k$.

The number and the spacing of the designated frequencies $f_k$ are chosen so the frequency response G(f) of the receiver 12 is determined to a specified accuracy. The accuracy to which the frequency response G(f) is determined generally increases as the number of designated frequencies $f_k$ increases. In an example where the stimulus signals S(f), S'(f) are frequency combs, the frequency offset δ between the first spectral position $F_{C1}$ and the second spectral position $F_{C2}$ is chosen to be equal to the frequency spacing Δ of the teeth of the frequency comb. Alternatively, when the frequency offset δ is not equal to the frequency spacing Δ, interpolation is used to acquire the first combined frequency response $X1_k$ and the second combined frequency response $X2_k$ at the three or more designated frequencies $f_k$.

The processor 18 designates that the distortion introduced to the stimulus signal S'(f) by the frequency response H'(f) of the signal path 16 is equivalent to the distortion introduced to the stimulus signal S(f) by the frequency response H(f). This designation is achieved by equating the frequency response H(f) of the signal path 16 to the frequency response H'(f), where the frequency response H'(f) is shifted from the frequency response H(f) by the frequency offset δ. This designation results in the frequency response of the signal path 16 tracking the shifting of the stimulus signal from the first spectral position $F_{C1}$ to the second spectral position $F_{C2}$. FIGS. 2B and 3B show the frequency response H'(f) tracking the stimulus signal S'(f) when the stimulus signal S(f) is shifted between the first spectral position $F_{C1}$ to the second spectral position $F_{C2}$. Thus, $S(F_{L1}+k\delta)=S'(F_{L2}+k\delta)=S(F_{L2}+(k+1)\delta)$ where $F_{L1}$ represents a lower spectral bandwidth position when the stimulus signal S(f) is in the first spectral position $F_{C1}$ and where $F_{L2}$ represents a lower spectral bandwidth position when the stimulus signal S'(f) is in the second spectral position $F_{C2}$. In the first spectral position $F_{C1}$, shown in FIG. 2A and FIG. 3A, the stimulus signal S(f) has a spectral bandwidth that extends from $F_{L1}$ to $F_{U1}$. In the second spectral position $F_{C2}$, shown in FIG. 2B and FIG. 3B, the stimulus signal S'(f) has a spectral bandwidth that extends from $F_{L2}$ to $F_{U2}$. Generally, the responses of the signal path 16 and receiver 12, and the stimulus signal are vector quantities having magnitude and phase components. FIGS. 2A–3B show the magnitude components versus frequency.

The processor 18 determines the frequency response G(f) of the receiver 12 and the frequency response H(f) of the signal path 16 at frequencies $f_k$ from the extracted first combined frequency response $X1_k$ and the extracted second combined frequency response $X2_k$. A time domain impulse response, or any other response suitable for characterizing the receiver 12 is optionally derived from the frequency response G(f), based on known mappings between the frequency domain and the time domain. The frequency response G(f) of the receiver 12 is determined according to equation 3 and equation 4. The frequency response H(f) of the signal path 16 is optionally determined according to equation 3 and equation 4.

$$X1_k = G_k H_k \quad (3)$$

$$X2_k = G_k H_{k+1} \quad (4)$$

where $G_k=G(f_k)$, and $H_k=H(f_k)$.

Table 1A shows correspondence between the three or more designated frequencies $f_k$, the extracted first combined frequency responses $X1_k$, the frequency response $H_k$ of the signal path 16 and the frequency response $G_k$ of the receiver 12, in the example where three frequencies $f_k$ have been designated. Table 1B shows correspondence between the three or more designated frequencies $f_k$, the extracted second combined frequency responses $X2_k$, the frequency response $H_{k+1}$ of the signal path 16 and the frequency response $G_k$ of the receiver 12, in the example where the three frequencies $f_k$ have been designated.

TABLE 1A

| $f_0$: | $X1_0$ | $G_0$ | $H_0$ |
| $f_1$: | $X1_1$ | $G_1$ | $H_1$ |
| $f_2$: | $X1_2$ | $G_2$ | $H_2$ |

TABLE 1B

| $f_0$: | $X2_0$ | $G_0$ | $H_1$ |
| $f_1$: | $X2_1$ | $G_1$ | $H_2$ |
| $f_2$: | $X2_2$ | $G_2$ | $H_3$ |

The application of equation 3 and equation 4 provides the frequency response $G_k$ of the receiver 12 at the designated frequencies $f_k$. First, an initial designation or estimate is made for one of the frequency responses $H_0$–$H_N$ of the signal path 16 at the designated frequencies $f_k$. For example, the initial designation is made for the frequency response $H_0$ of the signal path 16 at the first of the designated frequencies $f_0$. Using the extracted first combined frequency response $X1_0$ at frequency $f_0$, the frequency response $G_0$ of the receiver 12 at frequency $f_0$ is determined according to equation 3 as $X1_0/H_0$. Using the extracted second combined frequency response $X2_0$ at frequency $f_0$ and substituting the determined frequency response $G_0$ into equation 4 provides that the frequency response $H_1$ of the signal path 16 at frequency $f_0$ equals $X2_0/G_0$. Using the extracted first combined frequency response $X1_1$ at frequency $f_1$ and substituting $H_1$ into equation 3 provides that the frequency response $G_1$ of the receiver 12 at frequency $f_1$ equals $X1_1/H_1$. Using the extracted second combined frequency response $X2_1$ at frequency $f_1$ and substituting $G_1$ into equation 4 provides that the frequency response $H_2$ of the signal path 16 at frequency $f_1$ equals $X2_1/G_1$. Using the extracted first combined frequency response $X1_2$ at frequency $f_2$ and substituting $H_2$ into equation 3 provides that the frequency response $G_2$ of the receiver 12 at frequency $f_2$ equals $X1_2/H_2$. Using the extracted second combined frequency response $X2_2$ at frequency $f_2$ and substituting $G_2$ into equation 4 provides that the frequency response $H_3$ of the signal path 16 at frequency $f_2$ equals $X2_2/G_2$.

In this example, three designated frequencies $f_0 \ldots f_2$ are used to illustrate the application of equation 3 and equation 4 to determine the frequency response $G_k$. When there are more than three designated frequencies, the initial designation of the frequency response of the signal path 16 is made and equation 3 and equation 4 are similarly applied to determine the frequency response $G_k$ of the receiver 12. Once the frequency response of the receiver 12 is determined, the response of the receiver can be calibrated by compensating for amplitude unflatness, group delay variations and other distortion in the receiver 12, that in the absence of calibration, can limit the performance of the receiver 12.

Under condition that the stimulus signal S(f) is known, characterized, designated or otherwise established at the frequencies $f_0$–$f_N$, the frequency response $H_0$–$H_N$ of the signal path 16, determined through the application of equation 3 and equation 4, accurately represents the frequency response of the signal path 16. A time domain impulse response, or any other response suitable for calibrating the signal path 16 is optionally derived from the frequency response of the signal path 16, based on known mappings between the frequency domain and the time domain. Thus, the response of the signal path 16 is optionally determined according to the response calibration scheme. Once the frequency response of the signal path 16 is determined, the signal path 16 can be calibrated by compensating for amplitude unflatness, group delay variations and other distortion in the signal path 16.

Figure 4:
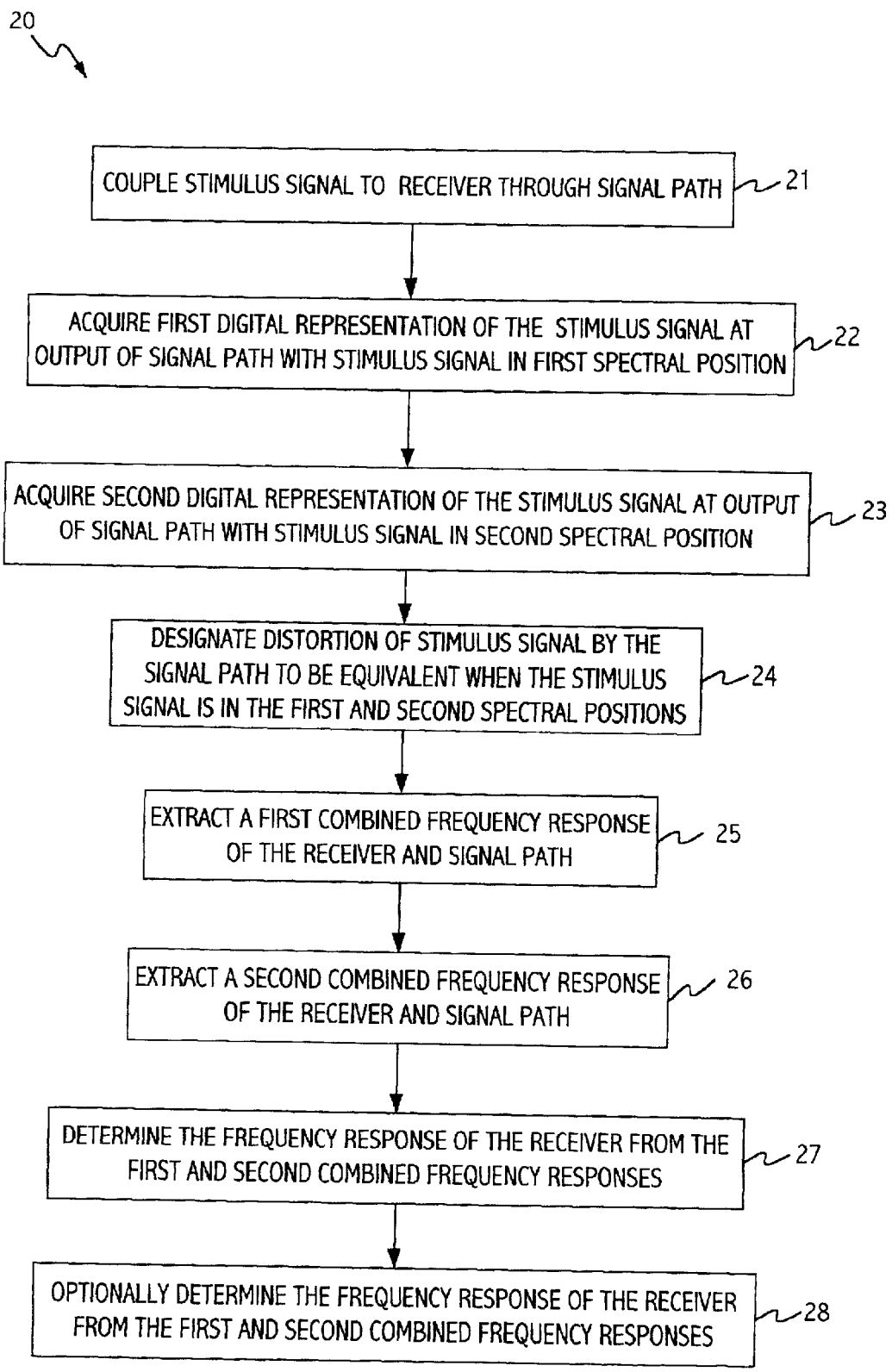
FIG. 4 is a flow diagram of the response calibration scheme constructed according to a second embodiment of the present invention.

FIG. 4 is a flow diagram of the response calibration scheme constructed according to a second embodiment of the present invention, where the response calibration scheme is implemented as a method 20. In step 21 of the method 20, the stimulus signal having non-zero bandwidth and adjustable spectral position is coupled to the receiver 12 through the signal path 16 that introduces distortion to the stimulus signal. In step 22, the receiver 12 acquires the first digital representation Y1(f) of the stimulus signal at the output O of the signal path 16 with the stimulus signal S(f) in a first spectral position $F_{C1}$. In step 23, the receiver 12 acquires the second digital representation Y2(f) of the stimulus signal at the output O of the signal path 16 with the stimulus signal in a second spectral position $F_{C2}$ shifted from the first spectral position $F_{C1}$ by a predetermined frequency offset δ.

In step 24, the distortion of the stimulus signal by the signal path 16 is designated to be equivalent when the stimulus signal S(f) is in the first spectral position $F_{C1}$ and when the stimulus signal S'(f) is in the second spectral position $F_{C2}$. Designating the distortion introduced to the stimulus signal by the signal path 16 to be equivalent when the stimulus signal is adjusted to the first spectral position $F_{C1}$ and when the stimulus signal is adjusted to the second spectral position $F_{C2}$ includes equating the frequency response H(f) of the signal path 16 to the frequency response H'(f) of the signal path 16 as shifted from the frequency response H(f) by the predetermined frequency offset δ so the frequency response H(f) and the frequency response H'(f) track the shifting of the stimulus signal from the first spectral position $F_{C1}$ to the second spectral position $F_{C2}$.

In step 25, the first combined frequency response $X1_k$ of the receiver 12 and the signal path 16 is extracted at at least three designated frequencies $f_k$ within the bandwidth of the stimulus signal. Extracting the first combined frequency response $X1_k$ of the receiver 12 and the signal path 16 at the at least three designated frequencies $f_k$ includes normalizing the first digital representation Y1(f) by the stimulus signal S(f) at the at least three predesignated frequencies $f_k$.

In step 26, the second combined frequency response $X2_k$ of the receiver 12 and signal path 16 is extracted at the at least three designated frequencies $f_k$ within the bandwidth of the stimulus signal. Extracting the second combined frequency response $X2_k$ of the receiver 12 and the signal path 16 the at least three designated frequencies $f_k$ includes normalizing the second digital representation Y2(f) by the stimulus signal S'(f) at the at least three designated frequencies $f_k$. In addition to using normalization to extract the combined frequency responses $X1_k$ and $X2_k$, adaptive filtering, cross correlation, cross spectrum analysis, adaptive channel modeling, and other known techniques are alternatively used to extract the combined frequency responses $X1_k$ and $X2_k$.

In step 27, a frequency response of the receiver 12 is determined from the first combined frequency response $X1_k$ and the second combined frequency response $X2_k$. Determining the response $G_k$ of the receiver 12 from the first combined frequency response $X1_k$ and the second combined frequency response $X2_k$ includes designating or estimating one of the frequency responses $H_0$–$H_N$ of the signal path 16 and solving for the frequency response $G_k$ of the receiver 12 according to equation 3 and equation 4. Under condition that the stimulus signal S(f) is known, characterized, designated or otherwise established at the frequencies $f_0$–$f_N$, the frequency response $H_0$–$H_N$ accurately represents the frequency response of the signal path 16. Thus, the frequency response of the signal path 16 is optionally determined through the application of equation 3 and equation 4 as shown in step 28. A time domain impulse response, or any other response suitable for calibrating the signal path 16 is optionally derived from the frequency response of the signal path 16, based on known mappings between the frequency domain and the time domain.

While the embodiments of the present invention have been illustrated in detail, it should be apparent that modifications and adaptations to these embodiments may occur to one skilled in the art without departing from the scope of the present invention as set forth in the following claims.

What is claimed is:

1. A response calibration scheme, comprising:
    a source providing a stimulus signal having a non-zero bandwidth and an adjustable spectral position;
    a signal path having an input coupled to the source, introducing a distortion to the stimulus signal between the input and an output;
    a receiver coupled to the output of the signal path, acquiring a first digital representation of the stimulus signal at the output of the signal path with the stimulus signal adjusted to a first spectral position, and acquiring a second digital representation of the stimulus signal at the output of the signal path with the stimulus signal adjusted to a second spectral position shifted from the first spectral position by a predetermined frequency offset;
    a processor, designating the distortion introduced to the stimulus signal by the signal path to be equivalent when the stimulus signal is adjusted to the first spectral position and when the stimulus signal is adjusted to the second spectral position, extracting a first combined frequency response of the receiver and the signal path at at least three predesignated frequencies within the bandwidth of the stimulus signal, extracting a second combined frequency response of the receiver and the signal path at the at least three predesignated frequencies within the bandwidth of the stimulus signal, and determining a response of the receiver from the first combined frequency response and the second combined frequency response.

2. The scheme of claim 1 wherein designating the distortion introduced to the stimulus signal by the signal path to be equivalent when the stimulus signal is adjusted to the first spectral position and when the stimulus signal is adjusted to the second spectral position includes equating a first frequency response of the signal path to a second frequency response of the signal path that is shifted from the first frequency response by the predetermined frequency offset so that the first frequency response and the second frequency response track the shifting of the stimulus signal from the first spectral position to the second spectral position.

3. The scheme of claim 1 wherein extracting the first combined frequency response of the receiver and the signal path includes normalizing the first digital representation by the stimulus signal in the first spectral position at the at least three predesignated frequencies and wherein extracting the second combined frequency response of the receiver and the signal path includes normalizing the second digital representation by the stimulus signal in the second spectral position at the at least three predesignated frequencies.

4. The scheme of claim 2 wherein extracting the first combined frequency response of the receiver and the signal path includes normalizing the first digital representation by the stimulus signal in the first spectral position at the at least three predesignated frequencies and wherein extracting the second combined frequency response of the receiver and the signal path includes normalizing the second digital representation by the stimulus signal in the second spectral position at the at least three predesignated frequencies.

5. The scheme of claim 1 wherein extracting the first combined frequency response of the receiver includes adaptive filtering the first digital representation and extracting the second combined frequency response of the receiver includes adaptive filtering the second digital representation.

6. The scheme of claim 2 wherein extracting the first combined frequency response of the receiver includes adaptive filtering the first digital representation and extracting the second combined frequency response of the receiver includes adaptive filtering the second digital representation.

7. The scheme of claim 2 wherein determining a frequency response ($G_k$) of the receiver from the first combined frequency response ($X1_k$) and the second combined frequency response ($X2_k$) includes designating one of the first frequency response of the signal path and the second frequency response of the signal path at a predetermined one of the at least three predesignated frequencies within the bandwidth of the stimulus signal, and solving for the frequency response ($G_k$) of the receiver using a first equation $X1_k = G_k H_k$ and a second equation $X2_k = G_k H_{k+1}$, wherein k is an integer that indexes the at least three predesignated frequencies.

8. The scheme of claim 4 wherein determining a frequency response ($G_k$) of the receiver from the first combined frequency response ($X1_k$) and the second combined frequency response ($X2_k$) includes designating one of the first frequency response of the signal path and the second frequency response of the signal path at a predetermined one of the at least three predesignated frequencies within the bandwidth of the stimulus signal, and solving for the frequency response ($G_k$) of the receiver using a first equation $X1_k = G_k H_k$ and a second equation $X2_k = G_k H_{k+1}$, wherein k is an integer that indexes the at least three predesignated frequencies.

9. The scheme of claim 6 wherein determining a frequency response ($G_k$) of the receiver from the first combined frequency response ($X1_k$) and the second combined frequency response ($X2_k$) includes designating one of the first frequency response of the signal path and the second frequency response of the signal path at a predetermined one of the at least three predesignated frequencies within the bandwidth of the stimulus signal, and solving for the frequency response ($G_k$) of the receiver using a first equation $X1_k = G_k H_k$ and a second equation $X2_k = G_k H_{k+1}$, wherein k is an integer that indexes the at least three predesignated frequencies.

10. The scheme of claim 2 wherein the processor determines a frequency response ($H_k$) of the signal path from the first combined frequency response ($X1_k$) and the second combined frequency response ($X2_k$) by designating one of the first frequency response of the signal path and the second frequency response of the signal path at a predetermined one of the at least three predesignated frequencies within the bandwidth of the stimulus signal, and solving for the frequency response ($G_k$) of the receiver using a first equation $X1_k = G_k H_k$ and a second equation $X2_k = G_k H_{k+1}$, wherein k is an integer that indexes the at least three predesignated frequencies.

11. A response calibration scheme, comprising:
    coupling a stimulus signal having a non-zero bandwidth and an adjustable spectral position to a receiver through a signal path that introduces distortion to the stimulus signal;
    acquiring, with the receiver, a first digital representation of the stimulus signal at an output of the signal path with the stimulus signal in a first spectral position;
    acquiring, with the receiver, a second digital representation of the stimulus signal at the output of the signal path with the stimulus signal in a second spectral position shifted from the first spectral position by a predetermined frequency offset;

designating the distortion introduced to the stimulus signal by the signal path to be equivalent when the stimulus signal is in the first spectral position and when the stimulus signal is in the second spectral position;

extracting a first combined frequency response of the receiver and the signal path at at least three predesignated frequencies within the bandwidth of the stimulus signal;

extracting a second combined frequency response of the receiver and signal path at the at least three predesignated frequencies within the bandwidth of the stimulus signal; and determining a response of the receiver from the first combined frequency response and the second combined frequency response.

12. The scheme of claim 11 wherein designating the distortion introduced to the stimulus signal by the signal path to be equivalent when the stimulus signal is in the first spectral position and when the stimulus signal is in the second spectral position includes equating a first frequency response of the signal path to a second frequency response of the signal path shifted from the first frequency response by the predetermined frequency offset so that the first frequency response and the second frequency response track the shifting of the stimulus signal from the first spectral position to the second spectral position.

13. The scheme of claim 11 wherein extracting the first combined frequency response of the receiver and the signal path includes normalizing the first digital representation by the stimulus signal in the first spectral position at the at least three predesignated frequencies and wherein extracting the second combined frequency response of the receiver and the signal path includes normalizing the second digital representation by the stimulus signal in the second spectral position at the at least three predesignated frequencies.

14. The scheme of claim 12 wherein extracting the first combined frequency response of the receiver and the signal path includes normalizing the first digital representation by the stimulus signal in the first spectral position at the at least three predesignated frequencies and wherein extracting the second combined frequency response of the receiver and the signal path includes normalizing the second digital representation by the stimulus signal in the second spectral position at the at least three predesignated frequencies.

15. The scheme of claim 11 wherein extracting the first combined frequency response of the receiver includes adaptive filtering the first digital representation and extracting the second combined frequency response of the receiver includes adaptive filtering the second digital representation.

16. The scheme of claim 12 wherein extracting the first combined frequency response of the receiver includes adaptive filtering the first digital representation and extracting the second combined frequency response of the receiver includes adaptive filtering the second digital representation.

17. The scheme of claim 12 wherein determining a frequency response ($G_k$) of the receiver from the first combined frequency response ($X1_k$) and the second combined frequency response ($X2_k$) includes designating one of the first frequency response of the signal path and the second frequency response of the signal path at a predetermined one of the at least three predesignated frequencies within the bandwidth of the stimulus signal, and solving for the frequency response ($G_k$) of the receiver using a first equation $X1_k = G_k H_k$ and a second equation $X2_k = G_k H_{k+1}$, wherein k is an integer that indexes the at least three predesignated frequencies.

18. The scheme of claim 14 wherein determining a frequency response ($G_k$) of the receiver from the first combined frequency response ($X1_k$) and the second combined frequency response ($X2_k$) includes designating one of the first frequency response of the signal path and the second frequency response of the signal path at a predetermined one of the at least three predesignated frequencies within the bandwidth of the stimulus signal, and solving for the frequency response ($G_k$) of the receiver using a first equation $X1_k = G_k H_k$ and a second equation $X2_k = G_k H_{k+1}$, wherein k is an integer that indexes the at least three predesignated frequencies.

19. The scheme of claim 16 wherein determining a frequency response ($G_k$) of the receiver from the first combined frequency response ($X1_k$) and the second combined frequency response ($X2_k$) includes designating one of the first frequency response of the signal path and the second frequency response of the signal path at a predetermined one of the at least three predesignated frequencies within the bandwidth of the stimulus signal, and solving for the frequency response ($G_k$) of the receiver using a first equation $X1_k = G_k H_k$ and a second equation $X2_k = G_k H_{k+1}$, wherein k is an integer that indexes the at least three predesignated frequencies.

20. The scheme of claim 12 further comprising determining a frequency response ($H_k$) of the signal path from the first combined frequency response ($X1_k$) and the second combined frequency response ($X2_k$) by designating one of the first frequency response of the signal path and the second frequency response of the signal path at a predetermined one of the at least three predesignated frequencies within the bandwidth of the stimulus signal, and solving for the frequency response ($G_k$) of the receiver using a first equation $X1_k = G_k H_k$ and a second equation $X2_k = G_k H_{k+1}$, wherein k is an integer that indexes the at least three predesignated frequencies.

* * * * *